United States Patent
Yang et al.

(10) Patent No.: US 12,081,033 B2
(45) Date of Patent: Sep. 3, 2024

(54) ELECTROMAGNETIC INDUCTION TYPE MAGNETIC ENERGY COLLECTOR BASED ON CAPACITIVE ENERGY STORAGE AND POWER IMPROVEMENT METHOD

(71) Applicant: XI'AN JIAOTONG UNIVERSITY, Shaanxi (CN)

(72) Inventors: Aijun Yang, Shaanxi (CN); Xiaohua Wang, Shaanxi (CN); Mingzhe Rong, Shaanxi (CN); Zhu Liu, Shaanxi (CN); Pengbo Zhao, Shaanxi (CN); Kai Ye, Shaanxi (CN); Huan Yuan, Shaanxi (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 164 days.

(21) Appl. No.: 17/864,040

(22) Filed: Jul. 13, 2022

(65) Prior Publication Data
US 2023/0179018 A1    Jun. 8, 2023

(30) Foreign Application Priority Data
Dec. 3, 2021 (CN) .......................... 202111471891.5

(51) Int. Cl.
*H02J 50/00* (2016.01)
*H02J 7/34* (2006.01)
(Continued)

(52) U.S. Cl.
CPC ............ *H02J 50/001* (2020.01); *H02J 7/345* (2013.01); *H02J 50/005* (2020.01);
(Continued)

(58) Field of Classification Search
CPC .. H02J 50/12; H02J 50/10; H02J 50/80; H02J 50/005; H02J 7/02; H02J 7/345; H02J 2207/20; H02J 50/001; H02J 50/402; H02J 2207/50; H02J 7/00712; H02J 4/00; H02J 50/20; H02J 50/27; H02J 50/60; H02J 50/70; H02J 7/00; H02J 7/0013; H02J 7/0042; H02J 7/0047; H02J 7/0063; H02J 7/34; H02J 7/35; H02J 9/062; H02J 9/08; H02M 3/33507; H02M 1/0058; H02M 1/32; H02M 1/4225; H02M 7/06; H02M 7/537;
(Continued)

(56) References Cited

U.S. PATENT DOCUMENTS

2021/0184499 A1*  6/2021  Huang ...................... H02J 7/02

* cited by examiner

*Primary Examiner* — Lincoln D Donovan
*Assistant Examiner* — Tyler J Pereny

(57) ABSTRACT

Disclosed are an electromagnetic induction type magnetic energy collector based on capacitive energy storage and a power improvement method. A main energy acquisition coil is sleeved in a main circuit to collect magnetic field energy, and a detection coil is sleeved in the main circuit to generate a sinusoidal signal for detecting zero crossing of a primary current; a switch group S2 and a switch group S1 are alternately turned on and off, a first rectifier bridge is connected to the switch group S2 and the switch group S1, and a comparator circuit is connected to the detection coil to compare the sinusoidal signal and convert the sinusoidal signal into a zero-crossing square wave signal; and a control module is connected to the comparator circuit, determines the zero crossing of the primary current based on the zero-crossing square wave signal.

10 Claims, 5 Drawing Sheets

(51) Int. Cl.
  *H02M 1/00*    (2007.01)
  *H02M 3/158*   (2006.01)

(52) U.S. Cl.
  CPC ....... *H02M 1/0058* (2021.05); *H02M 3/1588* (2013.01); *H02J 2207/20* (2020.01); *H02J 2207/50* (2020.01)

(58) Field of Classification Search
  CPC .......... H02M 3/1584; H02M 3/33584; H02M 3/33592; H02M 1/348; H02M 3/01; H02M 3/1586; H02M 3/1588; H02M 3/33573; H02M 5/458; H02M 7/219; Y02T 10/7072; Y02T 10/70; Y02T 90/14; Y02T 90/12
  See application file for complete search history.

ELECTROMAGNETIC INDUCTION TYPE MAGNETIC ENERGY COLLECTOR BASED ON CAPACITIVE ENERGY STORAGE AND POWER IMPROVEMENT METHOD

CROSS-REFERENCE TO RELATED APPLICATION

This application claims priority from the Chinese patent application 2021114718915 filed Dec. 3, 2021, the content of which is incorporated herein in the entirety by reference.

TECHNICAL FIELD

The present disclosure relates to the technical field of electromagnetic induction type magnetic energy collectors, in particular to an electromagnetic induction type magnetic energy collector based on capacitive energy storage and a power improvement method.

BACKGROUND

With the development of the smart power grid, a large number of sensors are used by the power grid to collect information. How to reliably supply power to the numerous sensors has become an urgent problem to be solved. The environmental micro-energy collection technology has been more and more widely used in the field of sensor network power supply, because the technology can overcome the problems of the difficulty in sensor wiring power supply, high maintenance cost of battery power supply and serious environmental pollution. Compared with vibration energy and electric field energy collection technologies, an electromagnetic induction type magnetic energy collector has gradually become a mainstream energy collection technology in the industry because of its high power density, low cost, simple structure and high power supply stability.

The electromagnetic induction type magnetic energy collector achieves energy output by inducing a voltage across a secondary coil, and its equivalent circuit model is as shown in FIG. 1. Output power depends on many factors such as primary current, magnetic core, the number of coil turns, load and circuit loss. In practical application, for the installed electromagnetic induction type magnetic energy collector, its output power mainly depends on the primary current and the load. The output power of the magnetic energy collector and the problems thereof are analyzed by means of the equivalent circuit model below.

For an ideal current transformer, its equivalent excitation inductance $L_m$ is infinite, and a current induced on a secondary side will flow to the load completely. In reality, the excitation inductance $L_m$ is limited, and an excitation current is inevitably needed to maintain a load voltage. When a primary current and a load resistance are small, the magnetic core is in an unsaturated state. When a high-permeability magnetic core is used, the equivalent excitation inductance impedance is much larger than the load resistance, and the shunt effect of excitation inductance is relatively weak. However, due to the small current and load resistance, the output power of the collector is low. When the primary current and load resistance are large, it can be concluded from the nonlinear characteristics of the magnetic core that the magnetic core may enter a saturation state at this point. After the magnetic core is saturated, the change of magnetic induction intensity inside the magnetic core is very small relative to the change of the excitation current, and there is almost no voltage induced on the secondary side. In the equivalent circuit model, $L_m$ decreases rapidly, the branch of the excitation inductor is approximately short-circuited, and the induced current almost flows through the branch of the excitation inductor completely, so that the output power of the collector is approximately zero.

The most direct method to improve the output power of the electromagnetic induction type magnetic energy collector is to increase the volume of the magnetic core, but the disadvantage is that the volume and cost of a device are significantly increased. The output power of the collector may be improved by reducing the shunt effect of the excitation inductance. The commonly adopted technique is that a compensation capacitor $C_p$ is connected in parallel to two ends of the secondary coil, and the technical principle is as shown in FIG. 2. The current flowing through the excitation inductance $L_m$ is inductive current. By matching of the compensation capacitor $C_p$, a capacitive current flowing through compensation capacitor $C_p$ and the inductive current flowing through the excitation inductor $L_m$ are equal in magnitude and opposite in direction, which may offset the shunt effect of excitation inductance to improve the output power of the magnetic energy collector. The main disadvantage of the technology is that in order to achieve a good current compensation effect, it is necessary to match the compensation capacitance with the excitation inductance. In practical application, due to the nonlinear characteristics of the magnetic core, the excitation inductance is related to the primary current and the load, and its matched compensation capacitance varies widely. Therefore, for the changing primary current and load, the effect of using fixed compensation capacitance is poor.

FIG. 3(a) and FIG. 3(b) show another technique to improve the output power of the magnetic energy collector. In the technique, a capacitor is connected in series in front of a rectifier circuit to shape the magnetic flux of the magnetic core, so as to achieve the purpose of improving the output power. When the primary current is small and the load voltage is low, the magnetic core is unsaturated, and the series-connected capacitor mainly plays the role of power factor correction, and the output power may be improved by selecting appropriate capacitance. When the primary current is large and the load voltage is high, the magnetic core is in the saturation state. For a period of time after the induced current commutates, the voltage polarity of the series-connected capacitor is opposite to the polarity of the load voltage, and the voltage of the capacitor cancels out part of the load voltage. The voltage across the secondary coil is significantly lower than the voltage when in the absence of the series-connected capacitor, so that the duration when the magnetic core is in the unsaturation state is prolonged, and then the output power of the magnetic energy collector is improved.

However, the optimal capacitance is related to the primary current and the load voltage. In order to adapt to the changing primary current and load voltage, it is necessary to adjust the capacitance of the series-connected capacitor after the primary current and the load voltage are detected. The adjustment of the capacitance of the series-connected capacitor in the circuit is hard to control and low in reliability, and the addition of a complex control circuit will significantly increase the cost of the magnetic energy collector. Meanwhile, when the primary current is too large, the peak value of the voltage of the capacitor is higher, which may cause damage to the capacitor and the magnetic energy collector. These shortcomings make the practical application of the technique difficult.

The above information disclosed in the background art section is only used to enhance the understanding of the background of the present disclosure, and therefore may contain information that does not constitute the prior art known to those of ordinary skill in the art.

SUMMARY

A purpose of the present disclosure is to provide an electromagnetic induction type magnetic energy collector based on capacitive energy storage and a power improvement method, so as to solve the problem that existing power improvement techniques cannot realize the protection of a device under heavy currents and the balancing of control difficulty and cost while adapting to the changing primary current and load.

In order to achieve the above purpose, the present disclosure provides the following technical solution.

An electromagnetic induction type magnetic energy collector based on capacitive energy storage of the present disclosure includes:
a magnetic core coil, which includes:
a main energy acquisition coil sleeved in a main circuit to collect magnetic field energy, and
a detection coil sleeved in the main circuit to generate a sinusoidal signal for detecting zero crossing of a primary current; a main circuit module, which includes:
a switch group S1, including a plurality of MOSFETs,
a switch group S2, including a plurality of MOSFETs, the switch group S2 and the switch group S1 being alternately turned on and off,
a first rectifier bridge connected to the switch group S2 and the switch group S1, an energy storage capacitor $C_{es}$, and
a load;
a detection module, which detects the zero crossing of the primary current and includes:
a comparator circuit connected to the detection coil to compare the sinusoidal signal and convert the sinusoidal signal into a zero-crossing square wave signal;
a control module, which is connected to the comparator circuit, determines the zero crossing of the primary current based on the zero-crossing square wave signal, and determines phases and duty ratios of a complementary control signal $g_0$ and a complementary control signal $g_1$ according to predetermined delay time; and
an isolation module, which is connected to the control module and comprises four optocouplers which are divided into one group for isolating and amplifying the complementary control signal $g_0$ and the other group for isolating and amplifying the complementary control signal $g_1$, four driving signals $G_{00}$, $G_{01}$, $G_{10}$ and $G_{11}$ generated by the four optocouplers being transmitted to gate ends and source ends of the corresponding MOSFETs to alternately turn on and off the switch group S2 and the switch group S1.

The electromagnetic induction type magnetic energy collector based on capacitive energy storage further includes a power module connected to the detection module and the isolation module.

In the electromagnetic induction type magnetic energy collector based on capacitive energy storage, the power module includes a DC-DC voltage regulating module and five isolation chips, wherein four of the isolation chips supply power to the isolation module, and the other one of the isolation chips supplies power to the detection module.

In the electromagnetic induction type magnetic energy collector based on capacitive energy storage, the detection module further includes a second rectifier bridge.

In the detection module of the electromagnetic induction type magnetic energy collector based on capacitive energy storage, a compared signal is a constant low-level DC signal, and the comparator circuit outputs a low level when the sinusoidal signal is smaller than the DC signal, and outputs a high level when the sinusoidal signal is greater than the DC signal.

In the electromagnetic induction type magnetic energy collector based on capacitive energy storage, the energy storage capacitor $C_{es}$ is connected in series to a front end of the main circuit module of the magnetic energy collector, and the switch group S2 and the switch group S1 are alternately turned on and off in the half cycle of each primary current to control the time when the capacitor and the load are connected to the circuit.

A power improvement method for an electromagnetic induction type magnetic energy collector based on capacitive energy storage comprises the following steps:

step 1, sleeving a detection coil in a main circuit to generate a sinusoidal signal through induction, sending the sinusoidal signal to a detection module, converting the sinusoidal signal into a zero-crossing square wave signal through a first rectifier bridge and a comparator circuit, and transmitting the sinusoidal signal to a control module;

step 2, determining, by the control module, zero crossing of a primary current based on the zero-crossing square wave signal, then determining duty ratios and phases of a complementary control signal $g_0$ and a complementary control signal $g_1$ according to predetermined delay time, and transmitting the complementary control signal $g_0$ and the complementary control signal $g_1$ to an isolation module;

step 3, isolating and amplifying, by the isolation module, the complementary control signal $g_0$ and the complementary control signal $g_1$, generating four signals $G_{00}$, $G_{01}$, $G_{10}$ and $G_{11}$ which are respectively applied to gate ends and source ends of corresponding MOSFETs as MOSFET driving signals, and controlling a switch group S2 and a switch group S1 in a main circuit module to be turned on and off alternately, so as to charge and discharge a capacitor; and step 4, returning to the step 2 after a predetermined period of time, and redetermining the zero crossing of the primary current to correct the duty ratios and the phases of the complementary control signal $g_0$ and the complementary control signal $g_1$.

In the power improvement method for the electromagnetic induction type magnetic energy collector based on capacitive energy storage, in the half cycle of each primary current, the two switch groups S1 and S2 are turned on and off alternately to control the time when the capacitor and a load are connected to the circuit.

In the electromagnetic induction type magnetic energy collector based on capacitive energy storage, when the switch group S1 is turned on and the switch group S2 is turned off, the capacitor and the load are disconnected from the circuit, the switch group S1 short-circuits a main energy acquisition coil, and a short-circuit current $i_s(t)$ flows through the main energy acquisition coil to prevent the accumulation of magnetic flux inside a magnetic core; when the switch group S1 is turned off and the switch group S2 is turned on, the capacitor and the load are connected to the circuit in series; when the magnetic core is unsaturated, the main energy acquisition coil charges the capacitor while supplying energy to the load; and after the magnetic core is in an saturation state, the capacitor is discharged through a circuit formed by turning on the switch group S2.

In the electromagnetic induction type magnetic energy collector based on capacitive energy storage, the switch group S1 is controlled to be turned on and the switch group S2 is controlled to be turned off within predetermined delay time $t_d$ after the zero crossing of the primary current, the switch group S1 is controlled to be turned off and the switch group S2 is controlled to be turned on after the predetermined delay time $t_d$, and the alternating on/off is repeated when in zero crossing of next current.

In the above technical solution, the electromagnetic induction type magnetic energy collector based on capacitive energy storage and the power improvement method provided by the present disclosure have the following beneficial effects: a waveform of the load current and the energy storage of the capacitor are controlled through the delay time $t_d$ introduced by the alternating on/off of the two switch groups S1 and S2, so that the power of the magnetic energy collector under different primary current and load conditions may be effectively improved; and by controlling the on/off of the switch groups S1 and S2, the time when the capacitor and the load are connected to the circuit is controlled to be near the time when in zero crossing of the primary current, thus realizing the protection of the device under high current conditions. Existing power improvement techniques for the magnetic energy collector cannot adapt to the changing primary current and load, or need to constantly adjust the capacitance of a parallel-connected compensation capacitor or a capacitor in series connection in front of a rectifier circuit in order to adapt to the changing current and load, and thus have the shortcoming that the control difficulty and cost are significantly increased.

Meanwhile, the existing power improvement techniques cannot protect the device under high current conditions. The method can effectively improve the power of the magnetic energy collector under different primary currents and loads without adjusting the capacitance, and effectively protect the device under high currents. In the method, the control difficulty and cost for alternately turning on and off the switching groups S1 and S2 are low.

BRIEF DESCRIPTION OF THE DRAWINGS

In order to more clearly explain the embodiments of the present application or the technical solution in the prior art, the drawings needed in the embodiments will be briefly introduced below. Obviously, the drawings in the following description are only some embodiments of the present disclosure. Those skilled in the art can also obtain other drawings according to these drawings.

DETAILED DESCRIPTION

Figure 1:
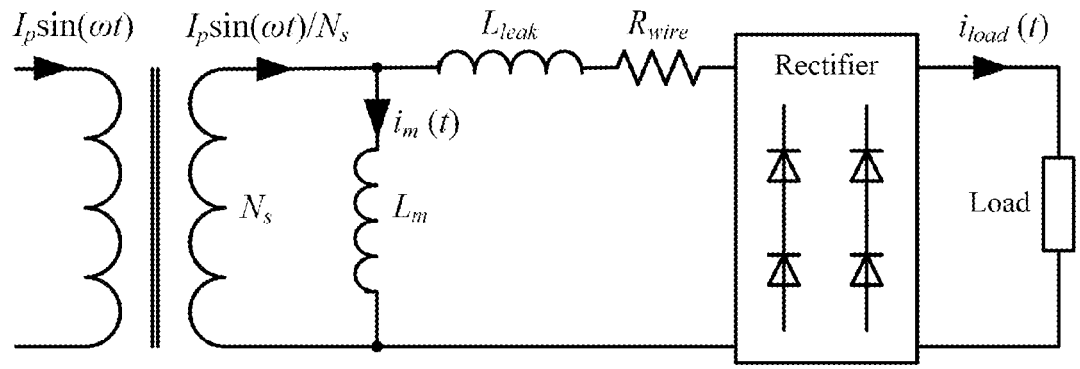
FIG. 1 is a schematic diagram of an equivalent circuit model of an electromagnetic induction type magnetic energy collector in the prior art, wherein $I_p \sin(\omega t)$ is primary current, $N_s$ is the number of coil turns, $I_p \sin(\omega t)/N_s$ is equivalent secondary current, $L_m$ is excitation inductance, $i_m(t)$ is excitation current, $L_{leak}$ is leakage inductance of a magnetic core, $R_{wire}$ is coil resistance, and load, $i_{load}(t)$ is load current. These variable parameters are universal in the whole text, and will not be explained later.
Figure 2:
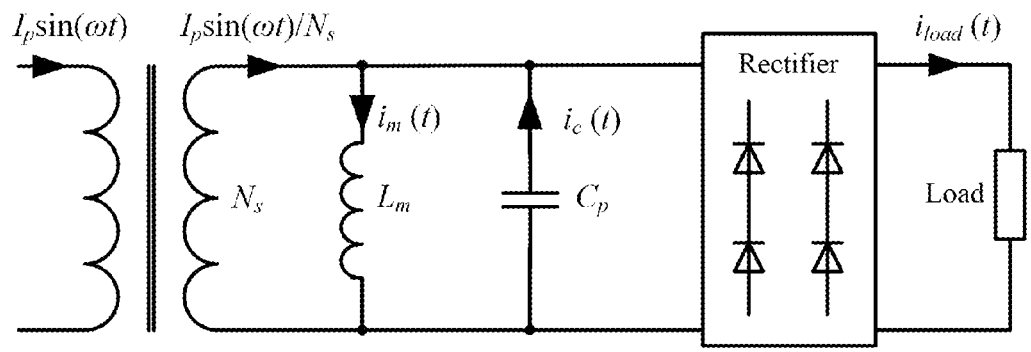
FIG. 2 is a schematic diagram of an energy acquisition technique of compensation capacitors connected in parallel at two sides of a secondary coil in the prior art, wherein $i_c(t)$ is a current flowing through an added compensation capacitor $C_p$.
Figure 3A:
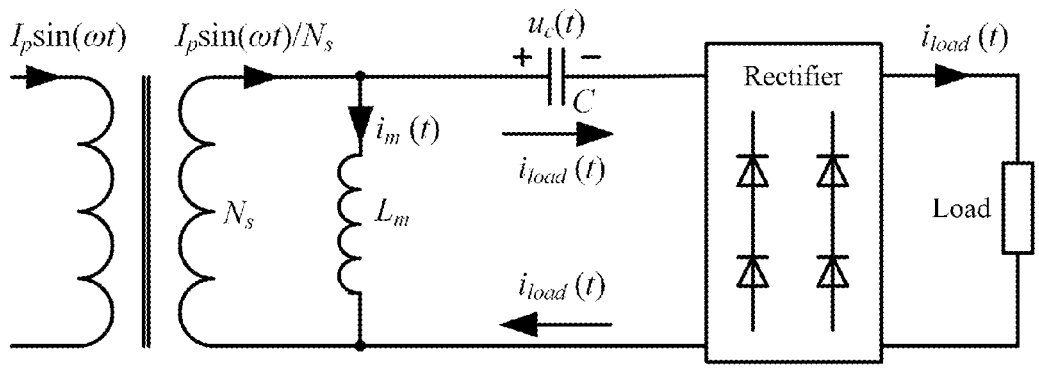
FIG. 3(a) and FIG. 3(b) are schematic diagrams of an energy acquisition technique of a series-connected magnetic flux shaping capacitor in the prior art, wherein $i_c(t)$ is a terminal voltage of the added magnetic flux shaping capacitor $C_p$.
Figure 3B:
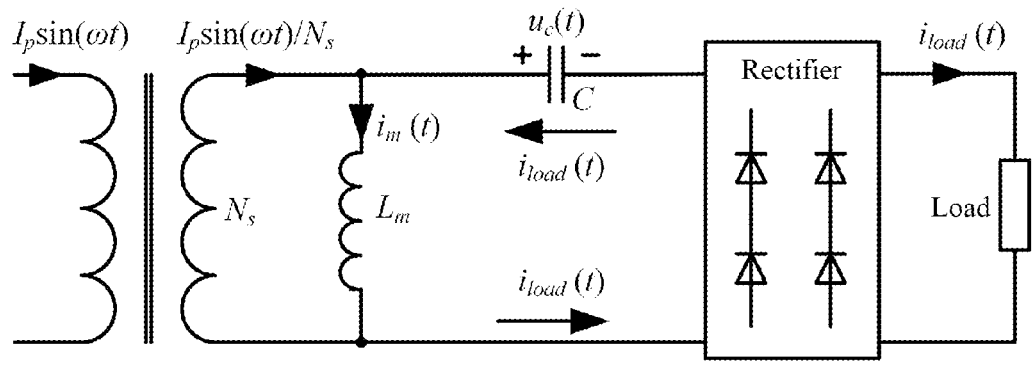

In order to make the purposes, technical solutions and advantages of the embodiments of the present disclosure clearer, the technical solutions in the embodiments of the present disclosure will be clearly and completely described below in combination with the embodiments of the present disclosure. Obviously, the described embodiments are part of the embodiments of the present disclosure, but not all of the embodiments. Based on the embodiments in the present disclosure, all other embodiments obtained by those of ordinary skill in the art without creative work are within the scope of the present disclosure.

Therefore, the following detailed description of the embodiments of the present disclosure provided in the figures is not intended to limit the scope of the claimed present disclosure, but only represents selected embodiments of the present disclosure. Based on the embodiments of the present disclosure, all other embodiments obtained by those of ordinary skill in the art without creative labor are within the scope of the present disclosure.

It should be noted that similar reference numerals and letters indicate similar items in the following figures, so once an item is defined in one figure, the item will not be further defined and explained in the following figures.

In the description of the present disclosure, it should be understood that the orientations or position relationships indicated by terms like "center", "longitudinal direction", "lateral direction", "length", "width", "thickness", "upper", "lower", "front", "back", "left", "right", "vertical", "horizontal", "top", "bottom", "inside", "outside", "clockwise" or "counterclockwise" are based on the orientations or position relationships shown in the drawings, and these terms are only for the convenience of describing the present disclosure and simplifying the description, and do not indicate or imply that the indicated equipment or elements must have a specific orientation, or must be constructed and operated in a specific orientation, and therefore cannot be understood as a limitation of the present disclosure.

Further, the terms "first" and "second" are only used for descriptive purposes, and cannot be understood as indicating or implying relative importance or implicitly indicating the quantity of indicated technical features. Therefore, the features defined with "first" and "second" may include one or more features explicitly or implicitly. In the description of the present disclosure, "a plurality of" means two or more, unless otherwise specifically defined.

In the present disclosure, unless otherwise specified and defined, the terms "install", "connect" and "fix" should be understood in a broad sense, for example, it may be fixed connection, detachable connection, integrated connection, or may be direct connection, indirect connection through an intermediate medium, internal communication between two elements or interaction between two elements. For those of ordinary skill in the art, the specific meanings of the above terms in the present disclosure may be understood according to specific situations.

In the present disclosure, unless otherwise explicitly specified and defined, the first feature being "above" or "below" the second feature may include direct contact between the first and second features, or may also include that the first and second features are not in direct contact but are in contact through another feature between the first and second features. Moreover, the first feature being "above", "over" or "on" the second feature includes that the first feature is right above or obliquely above the second feature, or simply indicates that the horizontal height of the first feature is greater than that of the second feature. The first feature being "below" the second feature includes that the first feature is right below or obliquely below the second feature, or simply indicates that the horizontal height of the first feature is smaller than that of the second feature.

In order to enable those skilled in the art to better understand the technical solutions of the present disclosure, the present disclosure will be described in further detail below in combination with the drawings. As shown in FIGS. 4(a)-8, an electromagnetic induction type magnetic energy collector based on capacitive energy storage includes:
  a magnetic core coil, which includes:
    a main energy acquisition coil 1 sleeved in a main circuit 3 to collect magnetic field energy, the number of turns being $N_s$, an output signal being $I_p \sin(\omega t)/N_s$, excitation inductance being $L_m$, and excitation current being $i_m(t)$, and
    a detection coil 2 sleeved in the main circuit 3 to generate a sinusoidal signal for detecting zero crossing of a primary current $I_p \sin(\omega t)$; a main circuit module 4, which includes:
    a switch group S1, including a plurality of MOSFETs, a short-circuit current flowing through S1 being $i_s(t)$ when S1 is turned on and S2 is turned off,
    a switch group S2, including a plurality of MOSFETs, the switch group S2 and the switch group S1 being alternately turned on and off,
    a first rectifier bridge 5 connected to the switch group S2 and the switch group S1,
    a load, and
    an energy storage capacitor $C_{es}$;
  a detection module 6, which detects the zero crossing of the primary current and includes:
    a comparator circuit connected to the detection coil 2 to compare the sinusoidal signal and convert the sinusoidal signal into a zero-crossing square wave signal;
  a control module 7, which is connected to the comparator circuit, determines the zero crossing of the primary current based on the zero-crossing square wave signal, and determines phases and duty ratios of a complementary control signal $g_0$ and a complementary control signal $g_1$ according to predetermined delay time $t_d$; and
  an isolation module 8, which is connected to the control module 7 and includes four optocouplers which are divided into one group for isolating and amplifying the complementary control signal $g_0$ and the other group for isolating and amplifying the complementary control signal $g_1$, four driving signals $G_{00}$, $G_{01}$, $G_{10}$ and $G_{11}$ generated by the four optocouplers being transmitted to gate ends and source ends of the corresponding MOSFETs to alternately turn on and off the switch group S2 and the switch group S1.

In a preferred embodiment, the electromagnetic induction type magnetic energy collector based on capacitive energy storage further includes a power module 9 connected to the detection module 6 and the isolation module 8.

In a preferred embodiment of the electromagnetic induction type magnetic energy collector based on capacitive energy storage, the power module 9 includes a DC-DC voltage regulating module and five isolation chips, four of the isolation chips supply power to the isolation module 8, and the other one of the isolation chips supplies power to the detection module 6.

In a preferred embodiment of the electromagnetic induction type magnetic energy collector based on capacitive energy storage, the detection module 6 further includes a second rectifier bridge.

In a preferred embodiment of the electromagnetic induction type magnetic energy collector based on capacitive energy storage, in the detection module 6, a compared signal is a constant low-level DC signal, and the comparator circuit outputs a low level when the sinusoidal signal is smaller than the DC signal, and outputs a high level when the sinusoidal signal is greater than the DC signal.

In a preferred embodiment of the electromagnetic induction type magnetic energy collector based on capacitive energy storage, the energy storage capacitor $C_{es}$ is connected in series to a front end of the main circuit module 4 of the magnetic energy collector, and the switch group S2 and the switch group S1 are alternately turned on and off in the half cycle of each primary current to control the time when the capacitor and the load are connected to the circuit.

In an embodiment, the switch group S1 includes a MOSFET $S_1$, a MOSFET $S_2$ and a MOSFET $S_5$ connected in series. Further, the MOSFET $S_2$ is connected in series with the MOSFET $S_1$, and the MOSFET $S_5$ is connected with the MOSFET $S_2$ via the second rectifier bridge.

In an embodiment, the switch group S2 includes a MOSFET $S_3$, a MOSFET $S_4$, a MOSFET $S_6$ and a MOSFET $S_7$ connected in series. Further, the MOSFET $S_4$ is connected with the MOSFET $S_6$ via the second rectifier bridge.

In an embodiment, the magnetic core of the main energy acquisition coil 1 is an annular magnetic core with an inner diameter of 32 mm, an outer diameter of 50 mm and a height of 20 mm, and the magnetic core is wound by a 0.9 mm coil for 200 turns. When the load resistance is set to 1000Ω and a transmission line current is 4 A, collected power through ordinary rectification is 91 mW. When the predetermined delay time is set to 4 ms and the energy storage capacitance is set to 3 μF, collected power is 134 mw, with a year-over-year increase of 47.5%.

In an embodiment, the electromagnetic induction type magnetic energy collector based on capacitive energy storage includes six parts, that is, a magnetic core coil, a main circuit module 4, a detection module 6, a control module 7, an isolation module 8 and a power module 9. The magnetic core coil is composed of a main energy acquisition coil 1 and a detection coil 2. The main energy acquisition coil 1 is connected to a main circuit 3 for collecting magnetic field energy and is a main coil of the magnetic energy collector. The detection coil 2 is relatively small and connected to the detection module 6 for detecting zero crossing of a primary current. The main circuit module 4 includes a switch group S1 ($S_1$, $S_2$, $S_5$) and a switch group S2 ($S_3$, $S_4$, $S_6$, $S_7$) each of which is composed of a plurality of MOSFETs, a rectifier bridge and a load. The detection module 6 is composed of a rectifier bridge and a comparator circuit. A comparison signal is a sinusoidal signal generated by the detection coil 2, and a compared signal is a set constant low-level DC signal. The comparator circuit outputs a low level when the sinusoidal signal is smaller than the DC signal, and outputs a high level when the sinusoidal signal is greater than the DC signal. The sinusoidal signal generated by the detection coil 2 is converted, by the comparator circuit, into a zero-crossing square wave signal which is transmitted to the control module 7. The purpose of the detection module 6 is to detect the zero crossing of the primary current. The control module 7 mainly adopts an MCU. The MCU determines the zero crossing of the primary current by receiving the zero-crossing square wave signal output by the detection module 6, and determines phases and duty ratios of complementary control signals $g_0$ and $g_1$ according to set delay time. The complementary control signals $g_0$ and $g_1$ are output to the isolation module 8. The isolation module 8 is composed of four optocouplers. The four optocouplers are divided into two groups to respectively isolate and amplify the two control signals $g_0$ and $g_1$ output by the control module 7. Generated four driving signals $G_{00}$, $G_{01}$, $G_{10}$ and $G_{11}$ are transmitted to gate ends and source ends of the corresponding MOSFETs, and the on/off of the MOSFETs is controlled by the driving signals to further control the on/off of corresponding branches in the main circuit 3. The power module 9 is composed of a DC-DC voltage regulating module and five isolation chips, wherein four of the isolation chips supply power to the isolation module 8 and the other one of the isolation chips supplies power to the detection module 6.

A power improvement method for an electromagnetic induction type magnetic energy collector based on capacitive energy storage includes the following steps:

step 1, sleeving a detection coil 2 in a main circuit 3 to generate a sinusoidal signal through induction, sending the sinusoidal signal to a detection module 6, converting the sinusoidal signal into a zero-crossing square wave signal through a first rectifier bridge 5 and a comparator circuit, and transmitting the sinusoidal signal to a control module 7;

step 2, determining, by the control module 7, zero crossing of a primary current based on the zero-crossing square wave signal, determining duty ratios and phases of a complementary control signal $g_0$ and a complementary control signal $g_1$ according to predetermined delay time, and transmitting the complementary control signal $g_0$ and the complementary control signal $g_1$ to an isolation module 8;

step 3, isolating and amplifying, by the isolation module 8, the complementary control signal $g_0$ and the complementary control signal $g_1$, generating four signals $G_{00}$, $G_{01}$, $G_{10}$ and $G_{11}$ which are respectively applied to gate ends and source ends of corresponding MOSFETs as MOSFET driving signals, and controlling a switch group S2 and a switch group S1 in a main circuit module 4 to be turned on and off alternately; and step 4, returning to the step 2 after a predetermined period of time, and redetermining the zero crossing of the primary current to correct the duty ratios and phases of the complementary control signal $g_0$ and the complementary control signal $g_1$.

In a preferred embodiment of the power improvement method for the electromagnetic induction type magnetic energy collector based on capacitive energy storage, in the half cycle of each primary current, the two switch groups S1 and S2 are turned on and off alternately to control the time when a capacitor and a load are connected to the circuit.

In a preferred embodiment of the power improvement method for the electromagnetic induction type magnetic energy collector based on capacitive energy storage, when the switch group S1 is turned on and the switch group S2 is turned off, the capacitor and the load are disconnected from the circuit, the switch group S1 short-circuits a main energy acquisition coil 1, and a short-circuit current $i_s(t)$ flows through the main energy acquisition coil 1 to prevent the accumulation of magnetic flux inside a magnetic core; when the switch group S1 is turned off and the switch group S2 is turned on, the capacitor and the load are connected to the circuit in series; when the magnetic core is unsaturated, the main energy acquisition coil 1 charges the capacitor $C_{es}$ while supplying energy to the load; and after the magnetic core is in a saturation state, the capacitor $C_{es}$ is discharged through a circuit formed by turning on the switch group S2.

In a preferred embodiment of the power improvement method for the electromagnetic induction type magnetic energy collector based on capacitive energy storage, the switch group S1 is controlled to be turned on and the switch group S2 is controlled to be turned off within predetermined delay time $t_d$ after the zero crossing of the primary current, the switch group S1 is controlled to be turned off and the switch group S2 is controlled to be turned on after the predetermined delay time $t_d$, and the alternating on/off is repeated when in zero crossing of next current.

Figure 4A:
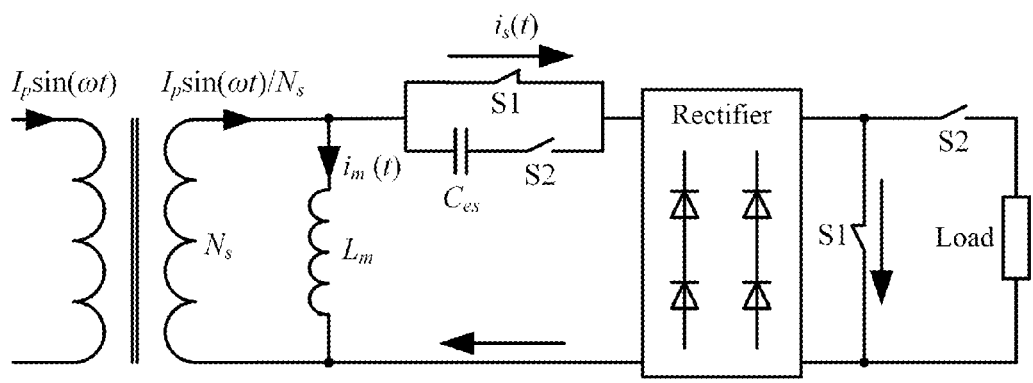
FIG. 4(a) and FIG. 4(b) are schematic diagrams of energy acquisition of an electromagnetic induction type magnetic energy collector based on capacitive energy storage in the present disclosure, wherein $C_{es}$ is an added energy storage capacitor, S1 and S2 are added switch groups, $i_s(t)$ represents a short-circuit current flowing through the switch group S1 when S1 is turned on and S2 is turned off, $i_{c1}(t)$ represents a capacitor current when a secondary side charges the capacitor and a load simultaneously under the condition that a magnetic core is unsaturated, $i_{c2}(t)$ represents a current that the energy storage capacitor $C_{es}$ discharges to the load when the magnetic core is saturated, and because the energy storage capacitor $C_{es}$ is connected in series to the load, $i_{c1}(t)$ and $i_{c2}(t)$ may also be regarded as load currents in different periods.
Figure 4B:
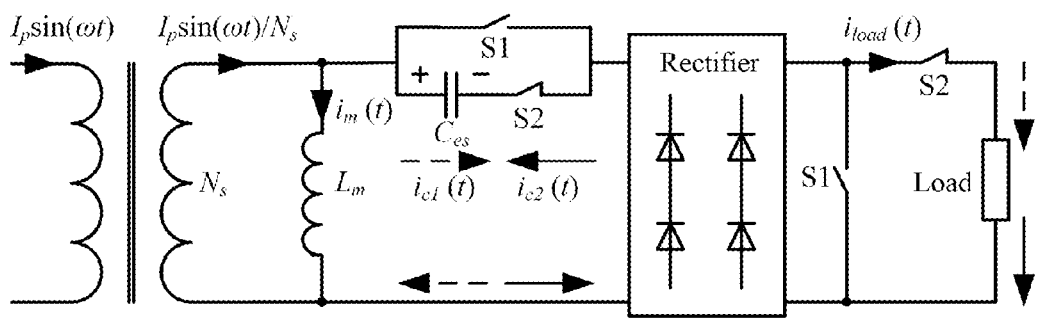

In an embodiment, in the power improvement method for the electromagnetic induction type magnetic energy collector based on capacitive energy storage, an energy storage capacitor $C_{es}$ is connected in series with a front end of a rectifier circuit of a magnetic energy collector with the number of turns of $N_s$. In the half cycle of each primary current $I_p \sin(\omega t)$, the time when the capacitor $C_{es}$ and the load are connected to a circuit is controlled through the alternating on/off of the two switch groups S1 and S2, thus realizing the control on the charging current of the capacitor and the load power. When the switch group S1 is turned on and the switch group S2 is turned off, as shown in FIG. 4(a), the capacitor and the load are disconnected from the circuit, and the switch group S1 short-circuits a secondary coil. A secondary coil current $I_p \sin(\omega t)/N_s$ mostly flows through the switch group S1, forming a short-circuit current $i_s(t)$, and a current $i_s(t)$ flowing through an excitation inductance $L_m$ is greatly reduced, which prevents unnecessary accumulation of magnetic flux inside a magnetic core. When the switch group S1 is turned off and the switch group S2 is turned on, as shown in FIG. 4(b), the capacitor and the load are connected in series to the circuit. When the magnetic core is unsaturated, the coil charges the capacitor while supplying energy to the load, as shown by a current $i_{c1}(t)$. After the magnetic core is in the saturation state, the capacitor is discharged through the circuit formed by turning on the switch group S2, as shown by a current $i_{c2}(t)$, and most of the energy stored by the capacitor is transmitted to the load through the circuit. Because of the series connection between the load and the energy storage capacitor $C_{es}$, a load current $i_{load}(t)$ is equal to $i_{c1}(t)$ when the magnetic core is unsaturated and is equal to $i_{c2}(t)$ when the magnetic core is saturated.

Figure 5:
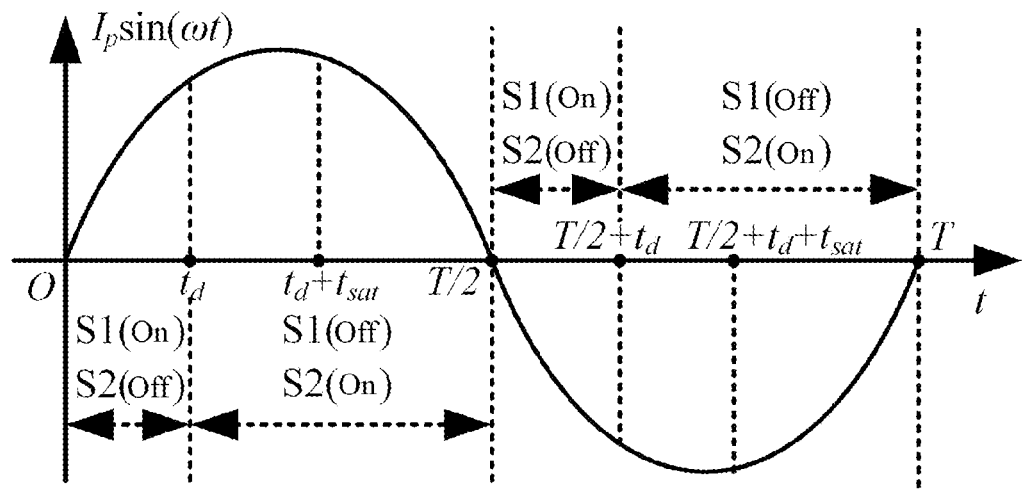
FIG. 5 is a schematic diagram showing control on the alternating on/off of switch groups S1 and S2 of an electromagnetic induction type magnetic energy collector based on capacitive energy storage in the present disclosure, wherein $t_d$ represents delay time, $t_d+t_{sat}$ represents a moment when the magnetic core is in a saturation state, and T represents a period of a primary side signal.
Figure 6:
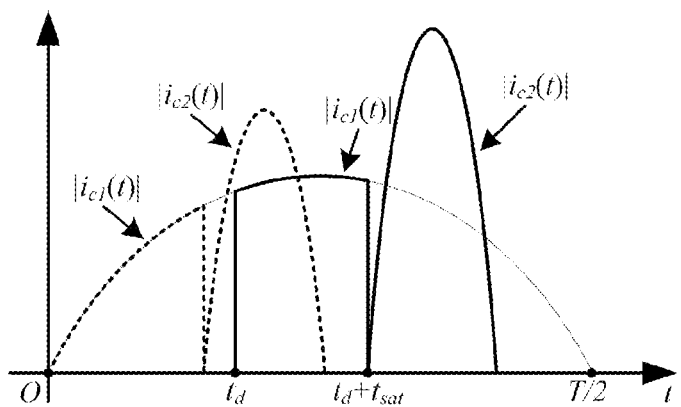
FIG. 6 is a diagram of the comparison of a waveform of a load current of a magnetic energy collector before and after the introduction of predetermined delay time according to an electromagnetic induction type magnetic energy collector based on capacitive energy storage in the present disclosure, in which the dotted line represents the load current without delay time, and the solid line represents load current in delay time.

Compared with the prior art where a capacitor is directly connected in series in front of a rectifier circuit, the method can control a waveform of the load current and the energy stored on the capacitor by alternately switching on and off the switch groups S1 and S2, and the specific control method is as shown in FIG. 5. Within the time period $t_d$ after the zero crossing of the primary current, the switch group S1 is controlled to be turned on and the switch group S2 is controlled to be turned off, and $t_d$ is defined as the delay time. After $t_d$, the switch group S1 is controlled to be turned off and the switch group S2 is controlled to be turned on, and the alternating on/off is repeated when in zero crossing of next current. Within the time period $[0, t_d]$, the secondary coil is short-circuited, and the capacitor and load are disconnected from the circuit. Within the time period $[t_d, t_d+t_{sat}]$, the coil charges the capacitor while supplying energy to the load. With the introduction of the delay time $t_d$, the effective value of the current $i_{c1}(t)$ is significantly increased, thus increasing the load power at this stage. Meanwhile, as a charging current of the capacitor increases, the energy stored on the capacitor also increases when the magnetic core is in the saturation state during the time period $t_d+t_{sat}$. Within the time period $[t_d+t_{sat}, T/2]$, the capacitor discharges to supply energy for the load. Due to the introduction of the delay time, the energy stored on the capacitor increases, and the effective value of the discharging current $i_{c2}(t)$ also increases, thereby further improving the load power at this stage. As shown in FIG. 6, the introduction of the delay time $t_d$ may increase the effective values of $i_{c1}(t)$ and $i_{c2}(t)$ under different primary current and load conditions. Therefore, the load power under different primary current and load conditions may be significantly improved compared with that in the case where the capacitor is directly connected in series in front of the rectifier circuit. Compared with the parallel compensation capacitor technology, the method can achieve a good power improvement effect under different primary current and load conditions by using the fixed energy storage capacitance. In the method, the delay time $t_d$ is introduced to improve the power of the magnetic energy collector under different primary current and load conditions when the energy storage capacitance is fixed.

Figure 7:
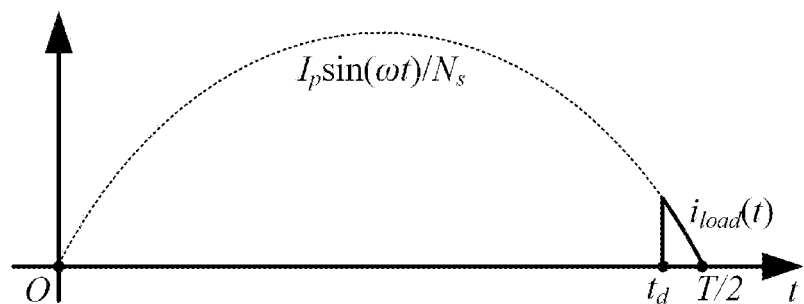
FIG. 7 is a schematic diagram of a waveform of a load current of an electromagnetic induction type magnetic energy collector based on capacitive energy storage in the present disclosure, wherein delay time is prolonged to protect a device.
Figure 8:
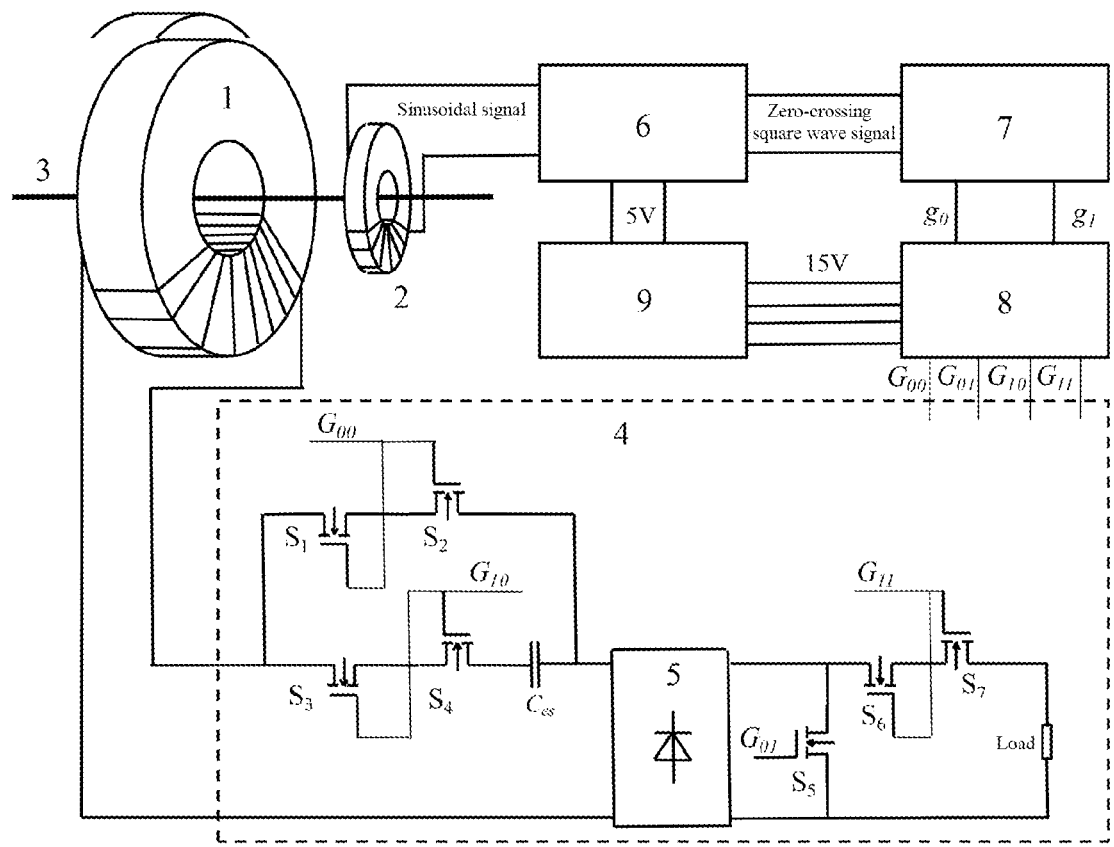
FIG. 8 is a structural diagram of an embodiment of an electromagnetic induction type magnetic energy collector based on capacitive energy storage in the present disclosure, wherein $G_{00}$, $G_{01}$, $G_{10}$ and $G_{11}$ are four driving signals generated by an isolation module 8, and $g_0$ and $g_1$ are control signals generated by a control module 7.

In addition, according to the method, the device can be protected under high current conditions by prolonging the delay time to be near the time when in zero crossing of next current, as shown in FIG. 7. The time when the switch group S1 is turned off and the switch group S2 is turned on is controlled to be near time when in zero crossing of next current, and the switch group S1 is kept on and the switch group S2 is kept off for the rest of the time. Because the amplitude of the current nearby the position of zero crossing is low, the time when the capacitor and the load are connected to the circuit is controlled to be near the time when in zero crossing of the current, a peak voltage of the capacitor and the load may be significantly reduced, thus achieving the purpose of protecting the device.

Because the power grid frequency is not always at an ideal value 50 Hz, but fluctuates within a small range in real time, the method of alternately switching on and off the switch groups S1 and S2 at the fixed power grid frequency may have an error. In order to accurately control the alternating on/off of the switch groups S1 and S2 under the fluctuation of the power grid frequency, the zero crossing of the primary current may be detected in a timed manner to realize the correction of control signals. Therefore, the method of alternately switching on and off the switch groups S1 and S2 may mainly include four steps: 1, detecting the zero crossing of the primary current by the detection coil 2 and the detection module 6; 2, outputting, by the control module 7, the control signals for switching on and off the switch groups S1 and S2 according to the detected zero crossing of the primary current and the set delay time $t_d$; 3, isolating and amplifying the control signals by the isolation module 8, and applying the control signals to the corresponding switches to control the on/off of the corresponding switches; and 4, after a period of time, returning to the step 1 to re-detect the zero crossing of the primary current to realize the correction of the control signals. Compared with the prior art in which the capacitance of the parallel-connected compensation capacitor or the capacitor in series connection in front of the rectifier circuit needs to be adjusted after the primary current and the load voltage are detected, the method has the advantages that the difficulty and the cost of the above steps are lower.

Figure 9:
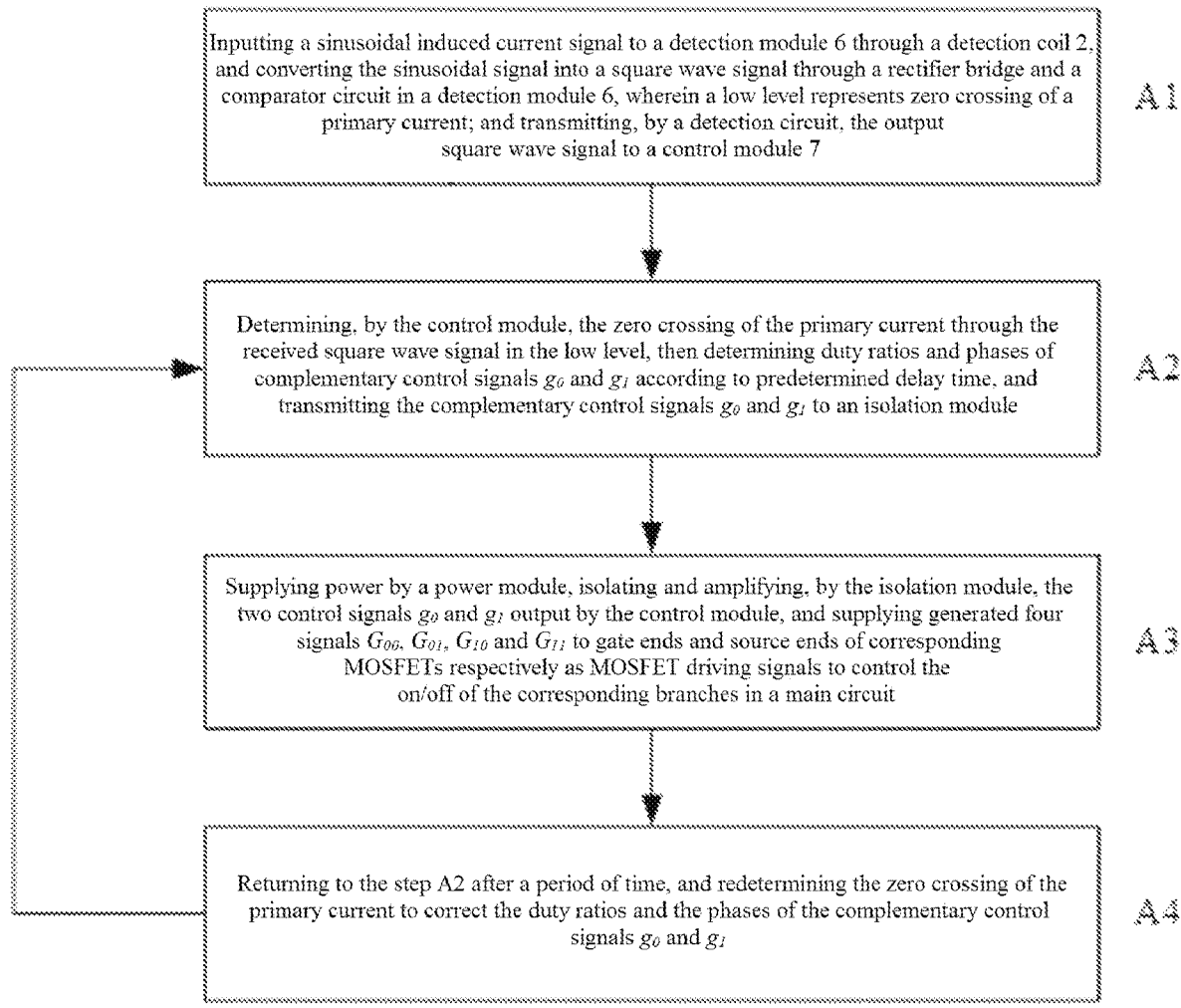
FIG. 9 is a flowchart of a power improvement method for an electromagnetic induction type magnetic energy collector based on capacitive energy storage in the present disclosure.

In an embodiment, as shown in FIG. 9, the power improvement method includes the following steps:

step A1, inputting a sinusoidal induced current signal to the detection module 6 through the detection coil 2, and converting the sinusoidal signal into a zero-crossing square wave signal through the rectifier bridge and the comparator circuit in the detection module 6, wherein a low level represents the zero crossing of the primary current; and transmitting, by a detection circuit, the output zero-crossing square wave signal to the control module 7;

step A2, determining, by the control module 7, the zero crossing of the primary current through the received zero-crossing square wave signal in low level, determining duty ratios and phases of complementary control signals $g_0$ and $g_1$ according to the predetermined delay time, and transmitting the complementary control signals $g_0$ and $g_1$ to the isolation module 8;

A3, supplying power by the power module 9, and isolating and amplifying, by the isolation module 8, the two control signals $g_0$ and $g_1$ output by the control module 7; applying the generated four signals $G_{00}$, $G_{01}$, $G_{10}$ and $G_{11}$ respectively to the gate ends and source ends of the corresponding MOSFETs as MOSFET driving signals to control the on/off of the corresponding branches in the main circuit 3; and A4, returning to the step A2 after a period of time, and redetermining the zero crossing of the primary current to correct the duty ratios and the phases of the complementary control signal $g_0$ and $g_1$.

In addition, the isolation module 8 may adopt other signal isolation and amplification methods, such as an operational amplifier circuit. The switch groups S1 and S2 may adopt other fully-controlled power electronic devices besides the MOSFETs, and these variations and substitutions belong to the scope of protection of the present disclosure.

Finally, it should be noted that the described embodiments are only part of the embodiments of the application, but not all of the embodiments. Based on the embodiments in the application, all other embodiments obtained by those skilled in the art without creative labor are within the scope of protection in the application.

Some exemplary embodiments of the present disclosure are described above by way of illustration only, and undoubtedly, those skilled in the art can modify the described embodiments in various ways without departing from the spirit and scope of the present disclosure. Therefore, the above drawings and descriptions are illustrative in nature, and should not be construed as limiting the scope of protection of the claims of the present disclosure.

The invention claimed is:

1. An electromagnetic induction type magnetic energy collector based on capacitive energy storage, comprising:
   a magnetic core coil, which comprises:
   a main energy acquisition coil sleeved in a main circuit to collect magnetic field energy, and
   a detection coil sleeved in the main circuit to generate a sinusoidal signal for detecting zero crossing of a primary current; a main circuit module, which comprises:
   a switch group S1, comprising a plurality of MOSFETs,
   a switch group S2, comprising a plurality of MOSFETs, the switch group S2 and the switch group S1 being alternately turned on and off,
   a first rectifier bridge connected to the switch group S2 and the switch group S1, and
   a load;
   a detection module, which detects the zero crossing of the primary current and comprises:
   a comparator circuit connected to the detection coil to compare the sinusoidal signal and convert the sinusoidal signal into a zero-crossing square wave signal;
   a control module, which is connected to the comparator circuit, determines the zero crossing of the primary current based on the zero-crossing square wave signal, and determines phases and duty ratios of a complementary control signal $g_0$ and a complementary control signal $g_1$ according to predetermined delay time; and
   an isolation module, which is connected to the control module and comprises four optocouplers which are divided into one group for isolating and amplifying the complementary control signal $g_0$, and the other group for isolating and amplifying the complementary control signal $g_1$, four driving signals $G_{00}$, $G_{01}$, $G_{10}$ and $G_{11}$ generated by the four optocouplers being transmitted to gate ends and source ends of the corresponding MOSFETs to alternately turn on and off the switch group S2 and the switch group S1.

2. The electromagnetic induction type magnetic energy collector based on capacitive energy storage according to claim 1, further comprising a power module connected to the detection module and the isolation module.

3. The electromagnetic induction type magnetic energy collector based on capacitive energy storage according to claim 1, wherein the power module comprises a DC-DC voltage regulating module and five isolation chips, four of the isolation chips supply power to the isolation module, and the other one of the isolation chips supplies power to the detection module.

4. The electromagnetic induction type magnetic energy collector based on capacitive energy storage according to claim 1, wherein the detection module further comprises a second rectifier bridge.

5. The electromagnetic induction type magnetic energy collector based on capacitive energy storage according to claim 1, wherein in the detection module, a compared signal is a constant low-level DC signal, and the comparator circuit outputs a low level when the sinusoidal signal is smaller than the DC signal, and outputs a high level when the sinusoidal signal is greater than the DC signal.

6. The electromagnetic induction type magnetic energy collector based on capacitive energy storage according to claim 1, wherein an energy storage capacitor $C_{es}$ is connected in series with a front end of the main circuit module of the magnetic energy collector, and the switch group S2 and the switch group S1 are alternately turned on and off in the half cycle of each primary current to control the time when the energy storage capacitor $C_{es}$ and the load are connected to the circuit.

7. A power improvement method for an electromagnetic induction type magnetic energy collector based on capacitive energy storage, comprising the following steps:
   step 1, sleeving a detection coil in a main circuit to generate a sinusoidal signal through induction, sending the sinusoidal signal to a detection module, converting the sinusoidal signal into a zero-crossing square wave signal through a first rectifier bridge and a comparator circuit, and transmitting the zero-crossing square wave signal to a control module;
   step 2, determining, by the control module, zero crossing of a primary current based on the zero-crossing square wave signal, then determining duty ratios and phases of a complementary control signal $g_0$ and a complementary control signal $g_1$ according to predetermined delay time, and transmitting the complementary control signal $g_0$ and the complementary control signal $g_1$ to an isolation module;
   step 3, isolating and amplifying, by the isolation module, the complementary control signal $g_0$ and the complementary control signal $g_1$, generating four signals $G_{00}$, $G_{01}$, $G_{10}$ and $G_{11}$ which are respectively applied to gate ends and source ends of corresponding MOSFETs as MOSFET driving signals, and controlling a switch group S2 and a switch group S1 in a main circuit module to be turned on and off alternately; and
   step 4, returning to the step 2 after a predetermined period of time, and redetermining the zero crossing of the primary current to correct the duty ratios and the phases of the complementary control signal $g_0$ and the complementary control signal $g_1$.

8. The power improvement method for the electromagnetic induction type magnetic energy collector based on capacitive energy storage according to claim 7, wherein in the half cycle of each primary current, the two switch groups S1 and S2 are turned on and off alternately to control the time when a capacitor and a load are connected to the circuit.

9. The power improvement method for the electromagnetic induction type magnetic energy collector based on capacitive energy storage according to claim 8, wherein when the switch group S1 is turned on and the switch group S2 is turned off, the capacitor and the load are disconnected from the circuit, the switch group S1 short-circuits a main energy acquisition coil, and a short-circuit current $i_s(t)$ flows through the main energy acquisition coil to prevent the accumulation of magnetic flux inside a magnetic core; when the switch group S1 is turned off and the switch group S2 is turned on, the capacitor and the load are connected to the circuit in series; when the magnetic core is unsaturated, the main energy acquisition coil charges the capacitor while supplying energy to the load; and after the magnetic core is in an saturation state, the capacitor is discharged through a circuit formed by turning on the switch group S2.

10. The power improvement method for the electromagnetic induction type magnetic energy collector based on capacitive energy storage according to claim 7, wherein the switch group S1 is controlled to be turned on and the switch group S2 is controlled to be turned off within predetermined delay time $t_d$ after the zero crossing of the primary current, the switch group S1 is turned off and the switch group S2 is turned on after the predetermined delay time $t_d$, and the alternating on/off is repeated when in zero crossing of next current.

* * * * *